United States Patent Office 3,043,910
Patented July 10, 1962

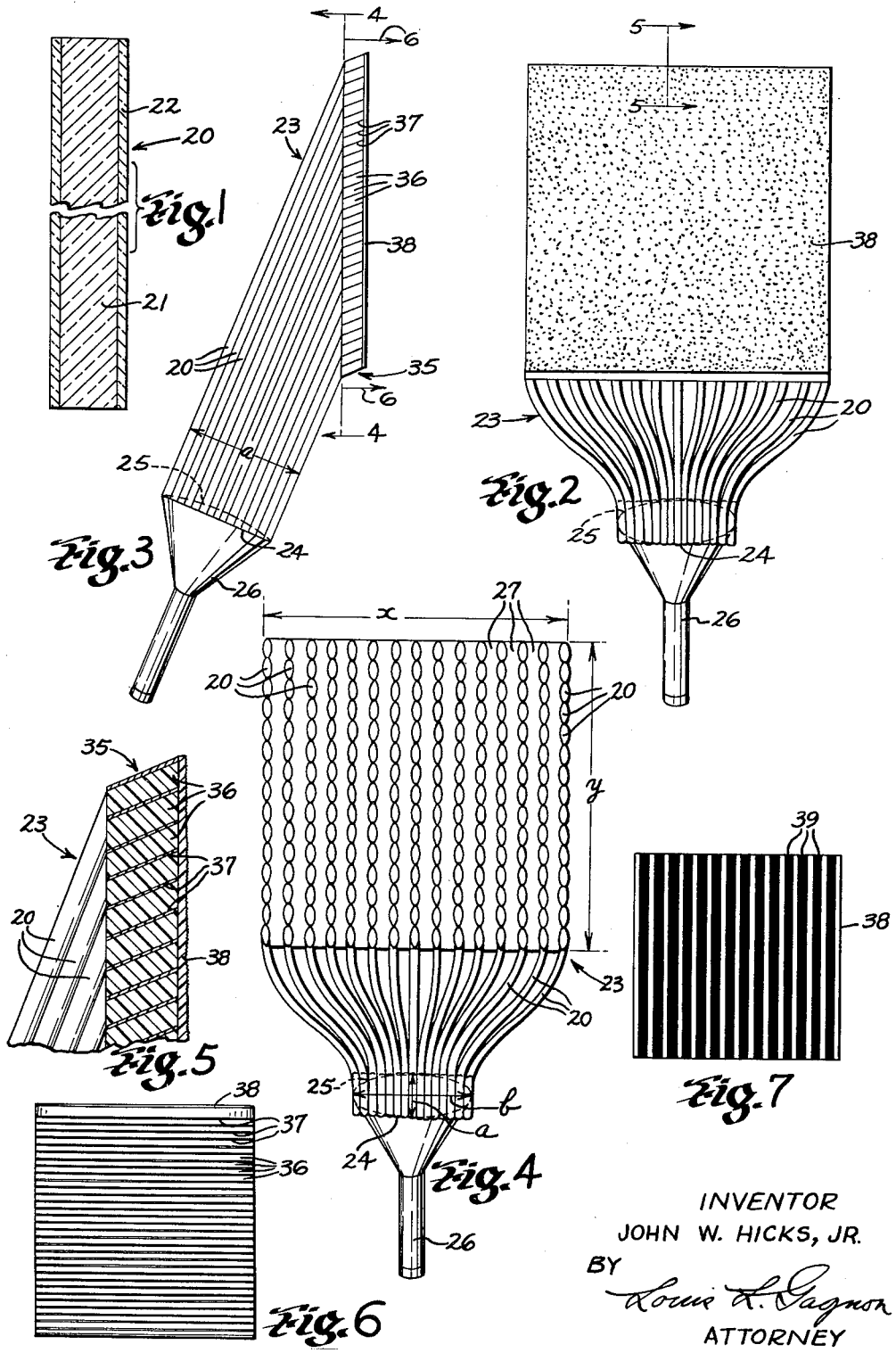
July 10, 1962     J. W. HICKS, JR     3,043,910
FIBER OPTICAL IMAGE TRANSFER DEVICES
Filed May 19, 1958     2 Sheets-Sheet 1
INVENTOR
JOHN W. HICKS, JR.
BY
Louis L. Gagnon
ATTORNEY July 10, 1962   J. W. HICKS, JR   3,043,910
FIBER OPTICAL IMAGE TRANSFER DEVICES
Filed May 19, 1958   2 Sheets-Sheet 2
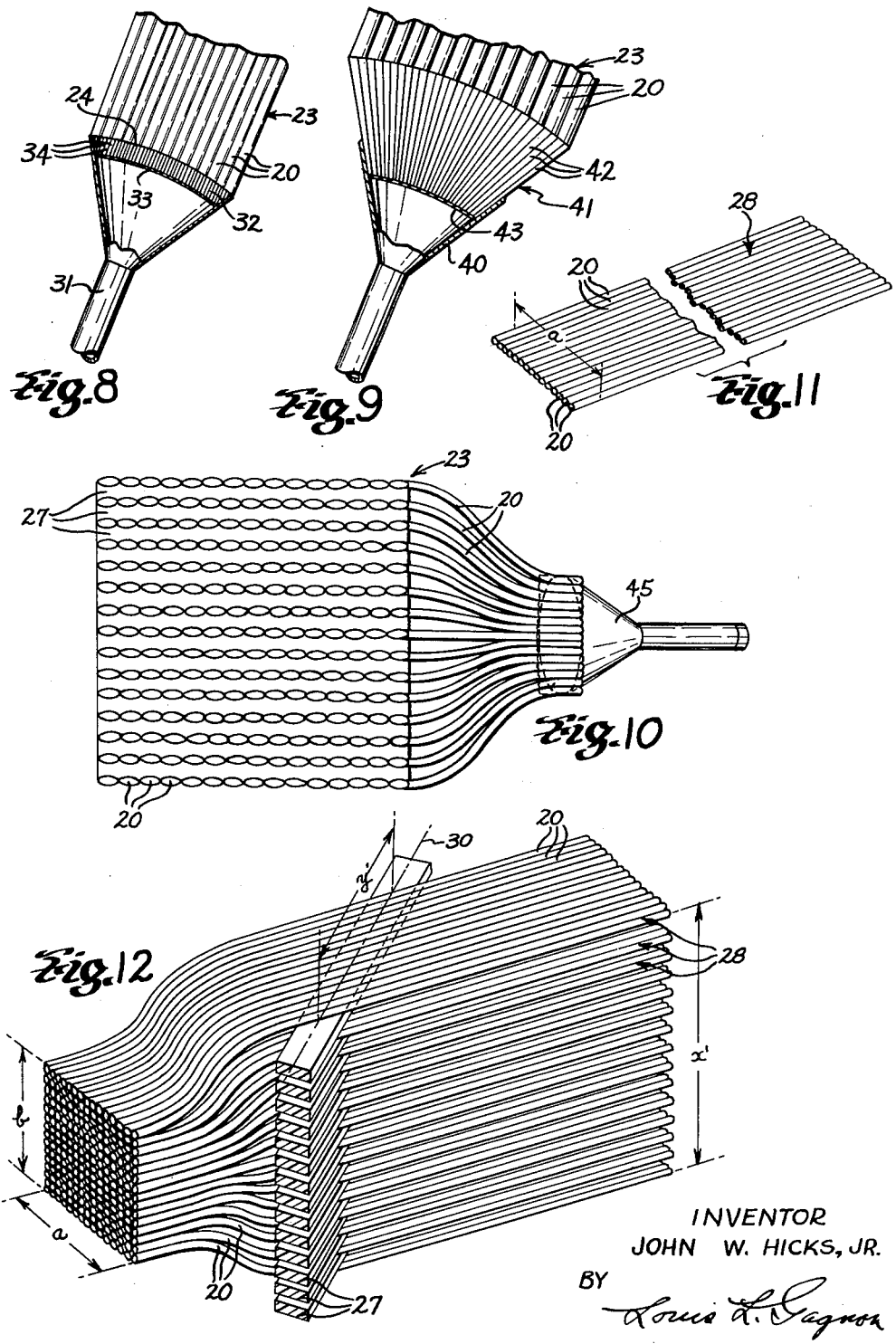
INVENTOR
JOHN W. HICKS, JR.
BY
Louis L. Gagnon
ATTORNEY

3,043,910
FIBER OPTICAL IMAGE TRANSFER DEVICES
John W. Hicks, Jr., Fiskdale, Mass., assignor to American Optical Company, Southbridge, Mass., a voluntary association of Massachusetts
Filed May 19, 1958, Ser. No. 736,172
5 Claims. (Cl. 178—7.85)

This invention relates to improvements in fiber optical image forming and transferring devices and more particularly to the provision of novel means in the form of a relatively large number of light-conducting fibers or filaments in grouped formation for transporting optical images from one location to another while providing good image resolution and quality.

In general, optical image transfer devices of the above character are well known and have been used to transfer optical images from one location to another by the well known principle of internal reflection wherein image forming light entering one end of each of the fibers or filaments of a grouping thereof will travel through the respective fibers and be emitted at the exit end of the group to reproduce the image formed at the entrance end of said group.

It has also been known in the art to adapt such devices to television systems for transferring and enlarging television images produced by relatively small kinescopes from the image forming face of such kinescopes to a remote viewing location. However, it has been found that only a partial solution to the problem of providing a relatively compact, inexpensive and effiecient image transfer device for use in television systems has been accomplished previous to this invention.

While the prior art fiber optical image transfer devices have been, to a certain degree, successful in use, they, in themselves, have been relatively complicated to manufacture, cumbersome, space consuming and economically prohibitive for wide spread commercial use where television systems of the above character must compete pricewise with the conventional direct view systems wherein the television image is viewed directly upon the image forming face of the kinescope.

Since the trend in the styling of present day television receivers is that of providing a set of shallow depth which has a minimum of thickness from front to back, while providing a picture image viewing area of increased size such as the well known "30 inch" or larger screen size, it has become necessary to devise means to replace the large screen size conventional direct view kinescopes with more compact means for providing the above mentioned large picture viewing area while greatly reducing the front to back thickness of the receiver.

A practical solution to this problem is, of course, the use of a very small kinescope in the television receiver and the provision of a relatively inexpensive but highly effective and compact means for transferring and greatly enlarging or magnifying the image produced by the small kinescope.

The present invention teaches such a solution and it is accordingly, an object of this invention to provide novel, efficient and compact means and method for transferring optical images from one location to another while simultaneously causing said transferred images to be greatly enlarged when received at said other location.

Another object is to provide improved compact means for use in a television receiver or the like for accurately and efficiently transferring an optical image from the face of a relatively small kinescope to a relatively large closely related viewing area and simultaneously magnifying said image an amount sufficient to cause the same to substantially cover said viewing area when received thereby.

Another object is to provide novel means and method for fabricating a fiber optical device consisting of a plurality of grouped light-conducting filaments or fibers so constructed and arranged relative to each other as to provide at one end of said group an area substantially greater in size than the area provided at the opposite end of said group.

Another object is to provide a fiber optical image transfer device of the above character wherein the light-conducting elements or fibers thereof are tightly packed in side-by-side substantially parallel relation with each other at one end thereof to provide the device with an image entrance end which is relatively small in cross-sectional area and the opposite ends of the elements or fibers of said bundle are spaced relative to each other at predetermined distances in one meridian or direction to produce an overall extended exit area of a predetermined width in said meridian and cut on their bias in a direction normal to said meridian, or otherwise so formed, to produce an extended exit area of a predetermined width in a meridian or direction normal to said first mentioned meridian in accordance with the extent of bias to which said elements or fibers are cut, or so formed, whereby an optical image produced at the entrance end of said device will be accurately enlarged when received at the exit end thereof.

Another object is to provide a fiber optical image transfer device of high image resolving power having image entrance and exit ends appreciably differing in cross-sectional size with the spacing or distance between said ends being relatively short in accordance with the difference in cross-sectional size of said entrance and exit ends of the device.

Another object is to provide an extremely compact optical image transfer device of the above character which is capable of transferring optical images from one location to another over a relatively short distance and simultaneously greatly enlarging said images while providing a high degree of resolution and a minimum of reduction in contrast and brightness between the first formed image and the enlarged transferred image.

Another object is to provide a greatly simplified method for manufacturing highly effective and efficient image magnifiers of the fiber optical type which are adapted to provide means by which television receivers may be greatly reduced in front to back thickness without proportionally reducing the size of the picture-viewing area on the receivers.

Other objects and advantages of the invention will become apparent from the following description when taken in conjunction with the accompanying drawings in which:

FIG. 1 is a greatly enlarged longitudinal cross-sectional view illustrating one type of light-conducting fibers which may be used in the fabrication of the device of the invention;

FIG. 2 is a front elevational view of the image transfer device of the invention diagrammatically illustrating its association with a television kinescope or the like when used to transfer and magnify television images;

FIG. 3 is a side elevational view of the device of FIG. 1;

FIG. 4 is a cross-sectional view taken substantially on line 4—4 of FIG. 3 and looking in the direction of the arrows;

FIG. 5 is a greatly enlarged fragmentary cross-sectional view taken substantially on line 5—5 of FIG. 2;

FIG. 6 is a cross-sectional view taken on line 6—6 of FIG. 3 looking in the direction of the arrows;

FIG. 7 is a rear face view of a modified light diffusing plate or screen which may be used in conjunction with the device of the invention;

FIG. 8 is a fragmentary side view, partially in section, of a television kinescope of a type to be used in conjunction with the device of the invention and illustrated in a position of use with a broken-away portion of said device;

FIG. 9 is a view generally similar to FIG. 8 but illustrating an alternative type of kinescope adapted for use with the device of the invention;

FIG. 10 is a front elevational view of a modified television projection arrangement embodying the device of the invention;

FIG. 11 is a fragmentary perspective view of an assembly of light-conducting fibers which forms a part of the device of the invention; and FIG. 12 is a perspective view diagrammatically illustrating a preferred method of fabricating the device of the invention.

Referring more particularly to the drawings wherein like characters of reference designate like parts throughout the several views, there is shown in FIG. 1 a greatly enlarged cross-sectional view of one type of light-conducting element or fiber 20 which may be used in the fabrication of the fiber optical image transfer device of the invention. The element or fiber 20 comprises an inner core 21 of high index flint glass or the like having thereon a relatively thin outer coating or cladding 22 of low index crown glass or the like. Fibers such as illustrated in FIG. 1 may be formed by many different techniques but in all instances the high index glass 21 is initially formed in the shape of a rod having the low index glass coating thereon and is drawn down to a desired filament or fiber size.

The term fiber as referred to herein is to be interpreted as including all light-conducting elements which are relatively long and small in cross-sectional area regardless of their cross-sectional configurations or degree of flexibility which is more or less dependent upon their dimensional characteristics. It should also be understood that the fiber 20 has been given by way of illustration only and other fibers such as coated plastic fibers may be used if desired. It will become apparent from the following description, however, that coated or clad glass fibers will produce the best results.

One embodiment of the invention which is shown in FIGS. 2 through 6 comprises an assembly 23 of a great number of light-conducting fibers 20 which are bundled together at one end 24 in tightly packed side-by-side relation with each other to form at said end 24 of the assembly, a light entrance area of relatively small cross-sectional size. The end 24 of the assembly 23 is optically finished by known means to a shape such as to intimately receive the image forming face part 25 of a television picture tube or kinescope 26 in the manner illustrated diagrammatically in FIGS. 2, 3 and 4. In so doing, image forming light from the face part 25 of the kinescope 26 will pass directly into the fibers 20 and be directed therethrough by the well known principle of internal reflection inherent to transilluminators such as fibers 20.

In order to expand or produce a magnification of the images formed on the face part 24 of the kinescope 26 at the opposite or exit ends of the fibers 20, said exit ends are fanned out or individually separated from each other by means of spacer strips or the like 27 only in one direction or meridian substantially in the manner illustrated more particularly in FIG. 4. By proper control of the width of the spacer strips 27, which extend vertically in the device illustrated in FIGS. 2–5, the overall width or horizontal dimension of the expanded exit end of the assembly 23 may be controlled to produce an enlarged image receiving area proportional to the amount of magnification or enlargement desired of the image which is produced at the entrance end 24 of the assembly 23.

It will be noted, however, that in the vertical direction or meridian of the assembly 23, the fibers 20 are maintained in side-by-side parallel engaging relation with each other (FIGS. 3 and 4) and in order to expand or produce a vertical enlargement or magnification of the image received at the exit end of the assembly 23, the fibers 20 are cut along their bias, or otherwise so formed, as illustrated in FIGS. 3 and 4. It can be readily seen that the extent of bias or angle of cut relative to the longitudinal axes of the individual fibers 20 will determine the extent of magnification or increase in size of the vertical dimension of the exit end of the bundle 23.

It is pointed out that in transferring a television picture image from one location to another and simultaneously enlarging said image with the fiber optical assembly 23, which has thus far been briefly described hereinabove, there are certain factors which must be considered in the fabrication of the assembly 23. First of all, the individual fibers 20 of the assembly 23 must be so arranged relative to each other as to provide the assembly with substantially identically geometrically patterned light entrance and exit end parts. That is to say, the cross-sectional arrangement of the opposite end parts of the fibers 20 of the assembly 23 must be substantially geometrically identical, (even though the exit end of the assembly has been expanded or enlarged as mentioned previously) so as to cause each particular part of the picture image produced by the kinescope 26, which is transferred by a particular fiber 20, to be accurately located in its true position relative to the other parts of the picture image when received at the exit end of the assembly 23. Furthermore, since television picture images are produced on kinescopes by horizontally scanning the kinescope face with an electron beam which produces, in conventional television kinescopes, approximately 500 adjacent horizontal trace lines across the face of the kinescope for each complete picture image, it is only reasonable to assume that good resolution in a reproduced or transferred picture image can only be accomplished if an adequate number of light-conducting fibers 20 are provided in the assembly 23 to cause each horizontal trace line of the picture image at the entrance end of the assembly 23 to pass over the light acceptance end of the fibers at all times and not between an array of fibers so as to cause a blanked out area in the reproduced picture image at the exit end of the assembly.

Since the television image is formed of approximately 500 trace lines as mentioned above good resolution in reproducing a picture image with an assembly such as 23 can only be accomplished by providing a minimum of 500 superimposed side-by-side light-conducting fibers in each vertical row of the assembly 23. The number of vertical rows of fibers and the spacing therebetween at the exit end of the assembly 23 will, of course, determine the width or horizontal dimension of the exit end of the assembly. It is pointed out, however, that by using 500 fibers in each vertical row, the entrance end of the assembly 23 must be accurately aligned relative to the image forming face 25 of the kinescope so as to cause the horizontal traces of the electron beam to pass over substantially the center point of each of the fibers 20 and not pass between two adjacent fibers where the image forming light will not be directed through the fibers 20 of the assembly.

Since electrical disturbances or other factors in the electronic systems of television receivers may cause the horizontal traces to vary somewhat in their locations on the picture face of the kinescope at different times, it is desirable to provide a much greater number of smaller vertically disposed fibers 20 in the assembly 23 so that all parts of each horizontal trace of the electron beam will pass over at least some part of the cross-sectional area of the fibers 20 at all times. It has been found that an array of 1000 or more fibers disposed in the vertical direction will provide good results and no particular care in aligning the entrance ends of the fibers with the horizontal trace lines of the kinescope is necessary since the reduced cross-sectional size of the fibers will produce an all-over pattern capable of accurately resolving the picture image on the picture face of the kinescope 26. Since the fibers 20 at the entrance end 24 of the assembly 23 are all bundled in side-by-side engaging relation with each other it can be seen that for a given cross-sectional area, the degree of resolution of an image transferred by the assembly 23 will be dependent upon the size of fibers used and consequently the number of fibers used to make up said area; the smaller fibers produce the higher degrees of resolution.

It is pointed out that extremely large fibers 20 have been shown in the drawings for purposes of illustration and it should be understood that a great many times as many fibers would actually be used to fabricate a device of the character being described herein.

In FIGS. 11 and 12 there is diagrammatically illustrated a preferred method of fabricating an assembly 23 of light-conducting fibers such as described hereinabove and shown in FIGS. 2–5. Since the light entrance end 24 of the assembly 23 must be of a cross-sectional area equal to or slightly greater than the picture forming face 25 of the kinescope 26, the vertical and horizontal dimensions "$a$" and "$b$" respectively (FIG. 4) of the kinescope face 24 are first determined. A plurality of flat ribbon-like structures 28 (FIG. 11) are next formed of a width substantially equal to the vertical dimension of the kinescope face 25. The structures 28 are each formed of a great number of individual substantially straight fibers 20 which have been aligned and lightly fused or otherwise secured together in side-by-side connected relation with each other by known means and method. The fiber sizes are selected in accordance with the degree of resolution desired of the finally formed assembly 23. Having thus formed the ribbon-like structures 28, the structures 28 are next stacked in superimposed relation with each other and individually separated by spacer strips 27 in the manner illustrated in FIG. 12. The number of layers of ribbon-like structures which are stacked as shown in FIG. 12 is determined by the horizontal dimension "$b$" of the kinescope face 25 so that when the light entrance end of the assembly 23 is subsequentially formed by causing the ends of each of the structures 28 to be brought into side-by-side engaging relation with each other in the manner shown in FIG. 10, the height or thickness of the light entrance end 24 of the structure of FIG. 10 will be substantially equal to the horizontal dimension of the picture face 25 of the kinescope 26. For example, if the vertical and horizontal dimensions "$a$" and "$b$" of the picture face 25 were equal and 500 fibers were used to make up each ribbon-like structure 28, 500 layers or structures 28 would be stacked as shown in FIG. 12 to ultimately form a square light entrance end 24 on the assembly 23. The procedure of forming the light entrance end 24 will be discussed in greater detail hereinafter.

The spacer strips 27 which are placed between each of the ribbon-like structures 28 are preferably formed of a suitable plastic material and are selected to be of equal predetermined thicknesses which, in combination with the thicknesses of the fibers 20, will produce a bundle of a height or thickness which is substantially equal to the width X (FIG. 4) desired at the exit end of the assembly 23.

During the stacking of the bundle shown in FIG. 12, the spacer strips 27 are placed in superimposed relation with each other between each of the ribbon-like structures 28 and are disposed with their longitudinal axes extending in a predetermined direction biasing the longitudinal axes of the fibers 20 in accordance with the height or vertical dimension "$y$" which is to be provided on the light exit end of the assembly 23 (FIG. 4). That is, the extent to which the spacer strips 27 bias, or are so angularly related to the longitudinal axes of the fibers 20 of the ribbon-like structures 28 is controlled to cause the distance "$y'$," FIG. 12, to equal the distance "$y$," FIG. 4.

During the assembly of the ribbon-like structures 28 and the spacer strips 27, the spacer strips are cemented or otherwise secured to their adjacent ribbon-like structures 28 with a suitable bonding material such as an epoxy resin or the like. This forms a rigid composite structure which is severed by sawing or otherwise cutting through the structure in the direction of the dot-dash line 30, FIG. 12, so as to divide each of the strips 27 substantially in half along their longitudinal axis. In this manner, two substantially identical fiber optical devices are simultaneously formed and it remains only to assemble the light entrance ends of each of the devices. This is accomplished by heat softening the ribbon-like structures intermediate their ends an amount sufficient to render them pliable without allowing the individual fibers 20 thereof to become detached from each other. The exit end 24 of the structure shown in FIG. 12 is then formed by forcing the ends of the ribbon-like structures into side-by-side engaging relation with each other. A suitable cement or epoxy resin may be placed between each of the light entrance ends of the ribbon-like structures 28 to securely hold them in place or the ends of the structures 28 may be lightly fused together in a well known manner. The light entrance end 24 of the assembly 23 is then optically finished as discussed above and the light exit end which is produced by the saw cut along line 30 is also optically finished flat by grinding and polishing.

Having been thus formed, the fiber-optical assembly 23 is placed in a generally upright position when in use in a television receiver, with the plane of its enlarged or exit end disposed substantially vertically and a television kinescope 26 is positioned with its picture forming face part 25 in engaging relation with the light entrance end 24 of the assembly 23. Image forming light from the kinescope 26 will then pass upwardly through the fibers 20 and be emitted at the exit ends thereof to form, at the light exit end of the assembly 23, an all over expanded or magnified accurate reproduction of the picture image which is produced at the light entrance end 24 of the assembly.

It is pointed out, however, that since the picture image is formed interiorally of a conventional television kinescope upon the phosphor coated inner side of its picture forming face, which face is of substantial thickness, it is essential to the successful operation of the device of the invention to replace the face parts of conventional television kinescope with means for directly conducting the image forming light from the inner phosphor coated surface thereof to the light entrance end of the assembly 23 since the refractive characteristics of conventional solid glass face parts of television kinescopes would cause a dispersion of the image forming light traveling therethrough from the phosphor coating to the exit ends of the fibers 20 of the assembly 23. This dispersion of light would cause parts of each picture element to intermix prior to reaching the light entrance end of the fibers 20 and thus result in a deterioration of the picture image emitted at the exit end of the assembly 23.

In order to overcome the above effects, the light entrance end 24 of the assembly 23 may be coated with the phosphor and directly connected to the end of a television kinescope so as to replace the conventional face part thereof. Thus, the electron beam emitted by the kinescope will strike directly upon the coated ends of the fibers 20 and the picture image light, thus formed, will pass directly into the assembly 23. However, since it is often necessary to replace the kinescopes of television receivers, such an arrangement would require the replacement of both the tube and assembly 23. For this reason, a more practical approach to this problem is to provide television kinescopes 31 of the type illustrated in FIG. 8 having fiber optical face pieces 32. In this manner the kinescopes are separable from the assembly 23 and easily replaceable. The face piece 32 is formed of a great number of relatively fine fiber optical elements in a manner such as shown and described in an application bearing Serial No. 715,406, filed February 14, 1958, in the name of Wilfred P. Bazinet. The inner surface 33 of the face piece 32 is coated with the phosphor and when bombarded with the electron beam of the kinescope, the image forming light produced thereon is conducted directly to the light entrance end 24 of the assembly 23 by the light-conducting fibers 34 which make up the face piece 32. Substantially no lateral spreading or overlapping of the light takes place while traveling from different locations on the phosphor 33 to the light entrance end 24 of the assembly 23. By providing a much greater number of fibers 34 in the face part 32 as compared to the number of fibers 20 in the assembly 23 the picture image received at the light entrance end 24 of the assembly 23 will be of a relatively high degree of resolution so that precise alignment of the fibers 20 with the fibers 34 is not required since the light acceptance area of each fiber 20 will cover several of the fibers 34. It has been found that for a unit area, two or more times as many fibers in the face part 32 as compared to the number of fibers in the assembly 23 will produce good results.

Since the assembly of light-conducting fibers 23, when in a position of use, is disposed with the fibers 20 thereof extending generally upwardly as shown in FIGS. 2–5 and the image forming light passing through the fibers 20 by the principle of internal reflection is also traveling generally upwardly, most of the light emitted from the expanded exit end of the assembly would normally tend to be directed upwardly and away from the line of sight of a viewer located forwardly or to one side of the light exit end of the assembly 23. In order to redirect the image forming light which is emitted from the light exit end of the assembly towards a viewing location forwardly of the device of FIGS. 2, 3 and 4, a louvered light directing member 35 is provided on the exit face of the assembly 23 as shown in FIGS. 2, 3 and 5. The member 35 is comprised of a great number of superimposed horizontally extending strips 36 or louvers of light-conducting plastic or glass material each of which is separated by light reflecting means 37 such as a silvered coating or layer of aluminum paint or any other known mirror like material. The opposite sides of the member 35 are optically finished in substantially parallel relation with each other and a light diffusing screen 38 is cemented or otherwise attached to the forward side of the member 35 while the opposite side thereof is cemented or otherwise attached in optical contact with the light exit end of the assembly 23. The strips 36, which are trapezoidal in cross-sectional shape, are so constructed as to cause the light reflecting means 37 therebetween to be disposed at an angle relative to the longitudinal axes of the fibers 20, which angle is such as to receive light emitted from the fibers 20 and redirect said light forwardly along paths substantially normal to the plane of the light exit end of the assembly 23. By constructing the light-conducting strips 36 of the member 35 of a height considerably less than the vertical dimension of each of the light exit ends of the fibers 20 so as to cause more than one of the reflecting means 37 to be disposed forwardly of each of the fibers 20, it is possible to cause substantially all of the light emitted from the fibers 20 to strike one or the other of the adjacent reflecting means 37 and be directed forwardly of the device.

Upon striking the diffusing screen 38 the image forming light will be diffused in the well known manner to produce an all over picture image on the screen 38 which picture image is an accurate magnified reproduction of the image formed at the kinescope picture face.

In order to produce a substantial gain in the useful illumination of the picture image on the screen 38, that is, to cause substantially all of the picture image forming light to be directed towards the locations in which the picture image is normally viewed, a directional diffusing screen may be employed to cause a horizontal diffusion of the picture image light with little or no diffusion of said light in the vertical meridian. Such screens are well known in the art. However, it would be preferable to use a diffusing screen of the type disclosed in an application Serial No. 654,483 filed April 23, 1957, in the name of Joseph Mahler, now U.S. Patent No. 2,928,131, which issued March 15, 1960, wherein the degree of light diffusion in either or both the horizontal and vertical meridians may be controlled and diffusion of the image forming light may be accomplished without causing diffraction of said light.

In order to further improve the quality of the magnified picture image produced by the device of the invention by increasing the signal to stray light ratio for the screen, the stray light which normally might pass from the kinescope between the fibers 20 or otherwise reach the rear surface of the screen 38 is prevented from illuminating the viewing face of the screen by providing vertical strips 39 of opaque or light absorbent material such as black paint or the like on the back of the screen 38 as shown in FIG. 7. With the screen in a position of use such as illustrated in FIGS. 1, 3 and 5, these strips 39 are located to lie between and blank out the area produced by the spacer strips 27 so as to allow practically only the light transmitted by the fibers 20 to reach and illuminate the viewing screen 38.

An alternative method of preventing stray light from illuminating the screen 38 is to construct the spacer strips 27 of an opaque material. In such a case, it would not be necessary to provide the strips 39 on the rear surface of the diffusing screen 38.

In FIG. 9 there is illustrated a television kinescope 40 having a modified fiber optical face piece 41 thereon. The face piece 41 is formed of a very great number of outwardly tapering light-conducting fibers 42 in tightly packed assembled connected relation with each other and having a phosphor coating 43 on their ends which are disposed within the kinescope 40. The face plate 41 will function as a magnifier in a well known manner when directing image forming light from its small end to its large end and thus tend to collimate the light passing therethrough. For example, if the face plate 41 was constructed as a 2× magnifier (where the cross-sectional area of each fiber 42 at its outer end was two times greater than the cross-sectional area of its smaller end) light entering the entrance ends of the fibers 42 from predetermined angles relative to their central axes will be emitted from the exit ends of said fibers at smaller angles relative to said central axes of substantially one-half of that of said entrance angles. Thus, the light exit cone of the fibers 42 is substantially one-half as large as the light entrance cone of said fibers.

By so collimating the light or reducing the size of the above mentioned light exit cones it can be seen that a less expensive glass, that is, a glass of lower index of refraction may be used in the cores 21 of the fibers 20 which are used in the assembly 23 of the device described hereinabove without sacrifice of the amount of light being directed from the image forming phosphor of the kinescope to the viewing screen 38 since it is a well known fact that in fibers such as illustrated in FIG. 1, the light acceptance cone of said fibers increases with the index of refraction of the glass comprising the core 21; the higher the index of the core 21, the larger the light acceptance cone of the fiber 20 and vice versa.

It is also pointed out that with an arrangement such as shown in FIG. 9 the above mentioned collimation of the image forming light transferred from the phosphor 43 to the viewing screen 38 of the device of the invention will produce a minimum of horizontal and vertical spread of the light emitted from the exit ends of the fibers 20 and thereby require only a horizontal diffusion of said emitted light to widen the viewing field only in the horizontal meridian of the screen 38.

There is shown in FIG. 10 a modification of the device shown and described hereinabove wherein the device of FIGS. 2–4 is simply turned sidewise and the kinescope 45 is rotated 45° relative to the light entrance end of the assembly 23 to cause its horizontal trace lines, which form the picture image, to scan the light entrance end of the assembly 23 in a direction normal to that described herein above. In this manner, each horizontal line of the television picture image received at the light exit end of the assembly 23 will be formed along one of the horizontally disposed rows of fibers 20. Louvered light directing means 35 and a light diffusing screen 38 such as shown in FIGS. 2, 3, 5, 6 and 7 is placed on the light exit end of the device of FIG. 10 to direct the light emitted therefrom forwardly into a desired viewing area.

From the foregoing, it can be seen that simple, efficient and economical means and method have been provided for accomplishing all the objects and advantages of the invention. Nevertheless, it is apparent that many details in the method of construction, arrangement of parts or steps in the method may be made without departing from the spirit of the invention as expressed in the accompanying claims and the invention is not limited to the exact matters shown and described as only the preferred matters have been given by way of illustration.

Having described my invention, I claim:

1. An image-transmitting device comprising a plurality of light-conducting fibers which are of substantially uniform cross-sectional configuration throughout their length and which are secured in side-by-side horizontally and vertically stacked parallel relation at one end, said fibers terminating at said one end in optically finished end faces of substantially uniform size which extend substantially normal to the fiber axes adjacent said one end, said end faces cooperating in a predetermined geometrical pattern to define a first image surface which extends in a general plane substantially normal to said fiber axes adjacent said surface, said fibers terminating at their opposite ends in optically finished end faces which obliquely intersect the fiber axes at said opposite ends at a common selected angle so that said opposite end faces are uniformly larger than said one end faces of the respective fibers along one meridian thereof, said opposite fiber ends being secured together with their axes parallel so that said opposite end faces cooperate in a pattern related to said predetermined pattern for defining a second, planar image surface which is larger than said first image surface along at least one meridian thereof and which extends obliquely at said selected angle relative to the fiber axes adjacent said second surface.

2. An image-transmitting device comprising a plurality of light-conducting fibers which are of substantially uniform cross-sectional configuration throughout their length and which are secured in side-by-side horizontally and vertically stacked parallel relation at one end, said fibers terminating at said one end in optically finished end faces of substantially uniform size which extend substantially normal to the fiber axes adjacent said one end, said end faces cooperating in a predetermined geometrical pattern to define a first image surface which extends in a general plane substantially normal to said fiber axes adjacent said surface, said fibers terminating at their opposite ends in optically finished end faces which cooperate in a pattern corresponding to said predetermined pattern for defining a second planar image surface proportionately larger than said first image surface along each of two mutually perpendicular meridians of said second surface, said opposite end faces of the fibers obliquely intersecting the fiber axes at said opposite fiber ends at a common selected angle so that said opposite end faces are uniformly larger than said one end faces of the respective fibers along one of said meridians, said opposite fiber ends being secured in adjoining parallel relation to adjacent fibers along said one meridian, and spacer means securing said opposite fiber ends in equally spaced parallel relation to adjacent fibers along the other of said meridians so that said second image surface extends obliquely at said selected angle relative to the fiber axes adjacent said second surface.

3. An image-producing device comprising a kinescope tube having an image screen; and an image-transfer device supported in registry with said tube for enlarging an image formed upon said screen, said image-transfer device comprising a plurality of light-conducting fibers which are of substantially uniform cross-sectional configuration throughout their length and which are secured in side-by-side horizontally and vertically stacked parallel relation at one end, said fibers terminating at said one end in optically finished end faces of substantially uniform size which extend substantially normal to the fiber axes adjacent said one end, said end faces cooperating in a predetermined geometrical pattern to define a first image surface which extends in a general plane substantially normal to said fiber axes adjacent said surface in coextensive superimposed relation to said tube screen, said fibers terminating at their opposite ends in optically finished end faces which cooperate in a pattern corresponding to said predetermined pattern for defining a second planar image surface proportionately larger than said first image surface along each of two mutually perpendicular meridians of said second surface, said opposite end faces of the fibers obliquely intersecting the fiber axes at said opposite fiber ends at a common selected angle so that said opposite end faces are uniformly larger than said one end faces of the respective fibers along one of said meridians, said opposite fiber ends being secured in adjoining parallel relation to adjacent fibers along said one meridian, and spacer means securing said opposite fiber ends in equally spaced parallel relation to adjacent fibers along the other of said meridians so that said second image surface extends obliquely at said selected angle relative to the fiber axes adjacent said second surface.

4. An image-producing device comprising a kinescope tube having an image screen, said tube being adapted to produce a light image upon said screen; an image-transfer device supported in registry with said tube for enlarging the light image formed upon said tube screen, said image-transfer device comprising a plurality of light-conducting fibers which are of substantially uniform cross-sectional configuration throughout their length and which are secured in side-by-side horizontally and vertically stacked parallel relation at one end, said fibers terminating at said one end in optically finished end faces of substantially uniform size which extend substantially normal to the fiber axes adjacent said one end, said end faces cooperating in a predetermined geometrical pattern to define a first image surface which extends in a general plane substantially normal to said fiber axes adjacent said surface in coextensive superimposed relation to said tube screen, whereby said fibers are adapted to receive light from respective portions of the light image formed upon said tube screen, said fibers terminating at their opposite ends in optically finished end faces which cooperate in a pattern corresponding to said predetermined pattern for defining a second planar image surface proportionately larger than said first image surface along each of two mutually perpendicular meridians of said second surface whereby said fibers are adapted to project light from said opposite end faces for reproducing said light image with relatively larger proportions, said opposite end faces of the fibers obliquely intersecting the fiber axes at said opposite fiber ends at a common selected angle so that said opposite end faces are uniformly larger than said one end faces of the respective fibers along one of said meridians, said opposite fiber ends being secured in adjoining parallel relation to adjacent fibers along said one meridian, and spacer means securing said opposite fiber ends in equally spaced parallel relation to adjacent fibers along the other of said meridians so that said second image surface extends obliquely at said selected angle relative to the fiber axes adjacent said second surface; a light-diffusing screen supported in spaced parallel relation to said second image surface of the image-transfer device; and a plurality of planar light-reflecting means supported in spaced side-by-side parallel relation extending across said second image surface of the image-transfer device between said second surface and said diffusing screen, said planar reflecting means being spaced at a separation less than the transverse dimension of said opposite fiber end faces contiguous thereto and being inclined relative to said second image surface at a predetermined angle for reflecting light projected from said opposite fiber end faces upon said diffusing screen in a direction substantially normal thereto, thereby to reproduce the light-image formed by said kinescope tube upon said diffusing screen.

5. An image-producing device as set forth in claim 4 wherein said spacer means embodied in said image-transfer device are opaque for substantially reducing the incidence of light other than that conducted by said fibers upon said diffusing screen.

References Cited in the file of this patent

UNITED STATES PATENTS

| | | |
|---|---|---|
| 1,751,584 | Hansell | Mar. 25, 1930 |
| 1,965,865 | Thompson | July 10, 1934 |
| 2,122,750 | Nicolson | July 5, 1938 |
| 2,354,591 | Goldsmith | July 25, 1944 |
| 2,510,106 | Henroteau | June 6, 1950 |
| 2,751,320 | Jacobs et al. | June 19, 1956 |
| 2,786,793 | Shobert | Mar. 26, 1957 |
| 2,825,260 | O'Brien | Mar. 4, 1958 |
| 2,906,169 | Saffir | Sept. 29, 1959 |
| 2,928,131 | Mahler | Mar. 15, 1960 |

FOREIGN PATENTS

| | | |
|---|---|---|
| 616,967 | Great Britain | Jan. 31, 1949 |